(No Model.)
E. H. CROSBY.
ELECTRIC HOSE COUPLING.
No. 368,654. Patented Aug. 23, 1887.
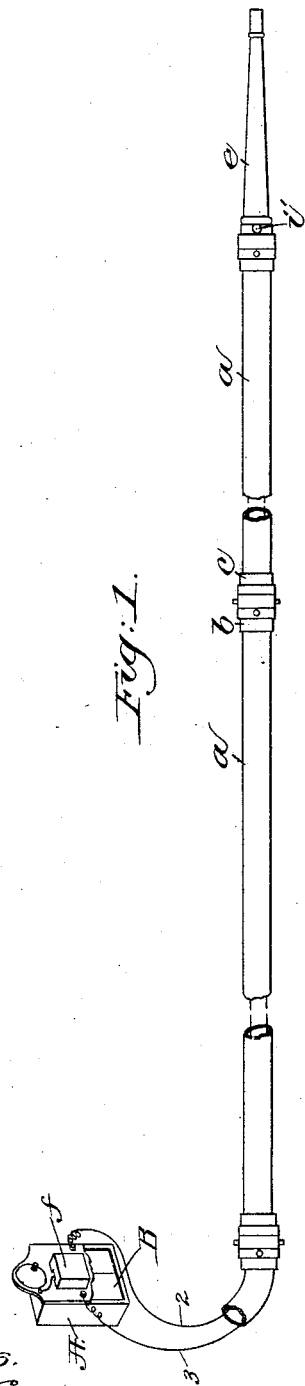
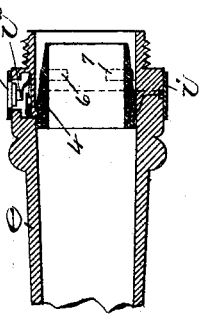
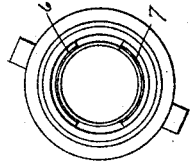
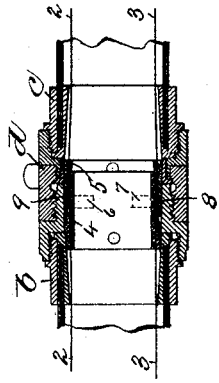
Witnesses.
Fria L. Emery
Frad. S. Greenleaf
Inventor.
Edward H. Crosby
By Crosby & Gregory
attys.

UNITED STATES PATENT OFFICE.

EDWARD H. CROSBY, OF BOSTON, MASSACHUSETTS.

ELECTRIC HOSE-COUPLING.

SPECIFICATION forming part of Letters Patent No. 368,654, dated August 23, 1887.

Application filed May 24, 1887. Serial No. 239,210. (No model.)

*To all whom it may concern:*

Be it known that I, EDWARD H. CROSBY, of Boston, county of Suffolk, and State of Massachusetts, have invented an Improvement in Signaling Apparatus for Hosemen, of which the following description, in connection with the accompanying drawings, is a specification, like letters on the drawings representing like parts.

This invention has for its object to construct an electric signaling apparatus by which a hoseman may communicate by code-signals with an engineer of a fire-engine, the essential feature of the invention being the construction of the coupling.

In accordance with this invention, two insulated wires are placed within the hose, and within each hose-coupling a water-tight non-metallic electric coupling is placed to continue the circuit. A push-button or equivalent circuit-changing device is placed at the base of the hose-nozzle for connecting the two wires, and upon the engine a bell or other signal-receiving instrument is placed. The battery employed is of the kind commonly known as a "dry-cell battery," and is placed upon the engine preferably in an inclosing-case with the bell. The coupling employed consists of two non-metallic rings—as hard rubber, for instance—secured one to each part of the hose-coupling, one of the said rings having a tapered external surface and the other having a tapered internal surface, to thus fit snugly one into the other. Each ring, at the tapered portion thereof, is provided with two contact-pieces—one contact-piece for each wire—so that when the parts of the hose-coupling are drawn together to couple the hose the two rings will also be drawn together, and the contact-pieces thereof will co-operate to continue the circuit.

Figure 1 shows in side view broken sections of hose having a signaling apparatus embodying this invention; Fig. 2, a longitudinal section of the hose-coupling and the electric coupling; Fig. 3, a longitudinal section of the coupling for the hose-nozzle, it showing a part of the electric coupling and the push-button; and Fig. 4, an end view of the hose-coupling, showing the electric coupling within it.

The sections of hose *a*, and hose-coupling formed of the two co-operating parts *b c*, and the collar *d*, and the hose-nozzle *e* are all as usual, so need not be herein described. Two insulated wires, 2 3, are placed within each section of hose. Each part of the hose-coupling has secured within it a non-metallic ring, as 4 5, one of which rings, as 4, is provided with a tapering external surface for a portion of its length, and the other ring, as 5, is provided with a tapering internal surface for a portion of its length, as best shown in Figs. 2 and 3, so that when the two parts of the hose-coupling are drawn together by the collar *d* the two rings will engage one another to form a water-tight joint. The rings 4 5 are made of india-rubber or some insulating material. The tapering surface of each ring 4 5 is provided transversely with two contact pieces or strips, 6 7 and 8 9, which, when the rings are in engagement with each other, co-operate to continue the circuit.

The bell *f*—preferably an ordinary vibrating bell—is placed upon the engine and connected with the wires 2 3, and a battery, B, is included in the circuit, such battery being of the kind commonly known as a "dry-cell" battery. I have herein shown such battery as inclosed in a case, A, with the bell.

An insulated collar, *i*, surrounds the base of the hose-nozzle *e*, which collar is provided with a hole, *i'*, to obtain access to a push-button, *i²*, seated in a recess in the base of the nozzle, one of the contact-springs of the push-button being connected with one of the contact-pieces of the ring within it, and the other contact-spring being connected with the other contact-piece of the ring, so that when the push-button is pressed the two wires 2 3 will be connected, closing the circuit and causing the bell *f* to respond.

Several different code-signals may be arranged—one, for instance, to give notice to the engineer that water is wanted, and another to stop the water.

By placing the electric coupling within the hose-coupling danger of an accidental break is avoided, which might easily happen if the coupling were arranged outside of the hose-coupling, and by having each part of the electric coupling secured within each part of the hose-coupling the corresponding wires will always be connected when the hose is coupled.

By making the electric coupling water-tight, of non-metallic material—such as hard rubber—the component parts of it will slightly expand, to thereby form a coupling, and as the contact-strips are thus entirely concealed, there will be no danger of short-circuiting the battery by the water in the hose.

I claim—

In a signaling device for hosemen, the wires 2 3, arranged within the hose, the battery, and receiving-instrument, combined with two rings, 4 5, of hard rubber or other insulating material, one of which has a tapering external surface and the other a tapering internal surface, as described, and secured one within each part of the usual hose-coupling, and contact-pieces secured to the tapering portions of the rings, substantially as described.

In testimony whereof I have signed my name to this specification in the presence of two subscribing witnesses.

EDWARD H. CROSBY.

Witnesses:
BERNICE J. NOYES,
B. DEWAR.